United States Patent
Otani et al.

(10) Patent No.: US 11,204,085 B2
(45) Date of Patent: Dec. 21, 2021

(54) VEHICLE DIFFERENTIAL APPARATUS

(71) Applicant: Honda Motor Co., Ltd., Tokyo (JP)

(72) Inventors: Tetsuya Otani, Wako (JP); Yoshinori Sato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/169,860

(22) Filed: Feb. 8, 2021

(65) Prior Publication Data

US 2021/0262558 A1 Aug. 26, 2021

(30) Foreign Application Priority Data

Feb. 25, 2020 (JP) .............................. JP2020-028997

(51) Int. Cl.
| | |
|---|---|
| *F16H 48/11* | (2012.01) |
| *F16H 48/38* | (2012.01) |
| *B60K 17/16* | (2006.01) |
| *F16H 48/285* | (2012.01) |
| *F16H 48/10* | (2012.01) |

(52) U.S. Cl.
CPC ............ *F16H 48/11* (2013.01); *B60K 17/165* (2013.01); *F16H 48/285* (2013.01); *F16H 48/38* (2013.01); *F16H 2048/106* (2013.01); *F16H 2048/387* (2013.01)

(58) Field of Classification Search
CPC ........ F16H 48/11; F16H 48/38; F16H 48/285; F16H 2048/106; F16H 2048/387
See application file for complete search history.

(56) References Cited

U.S. PATENT DOCUMENTS

| | | | | |
|---|---|---|---|---|
| 4,132,090 | A * | 1/1979 | McDermott | B23F 5/24 |
| | | | | 409/12 |
| 9,897,186 | B2 * | 2/2018 | Jin | F16H 48/40 |
| 11,028,914 | B2 * | 6/2021 | Jin | F16H 57/037 |
| 2009/0186739 | A1 * | 7/2009 | Fujii | F16H 48/285 |
| | | | | 475/248 |

FOREIGN PATENT DOCUMENTS

| | | | | |
|---|---|---|---|---|
| GB | 831673 | A * | 3/1960 | ............ F01B 3/0052 |
| JP | 2006118671 | A * | 5/2006 | |
| JP | 5018505 | B2 | 9/2012 | |

* cited by examiner

*Primary Examiner* — Sherry L Estremsky
(74) *Attorney, Agent, or Firm* — Duft & Bornsen, PC

(57) ABSTRACT

A vehicle differential apparatus including a pair of side gears arranged side by side along an axial line, a set of pinion gears disposed on a radial outside of the side gears so as to engage with the side gears and engaged with each other, and a housing forming a housing space of the pinion gears to rotate integrally with the pinion gears. Each of the side gears includes an inner and outer side gears, the inner and outer side gears include a first and second splines extended along helical gears formed on an outer and inner circumferential surfaces of the inner and outer side gears, respectively, and engaging with each other, and the helical gear of the first spline is formed so as to be crowned along a tooth trace thereof.

7 Claims, 7 Drawing Sheets

LEFT ← → RIGHT

VEHICLE DIFFERENTIAL APPARATUS

CROSS-REFERENCE TO RELATED APPLICATION

This application is based upon and claims the benefit of priority from Japanese Patent Application No. 2020-028997 filed on Feb. 25, 2020, the content of which is incorporated herein by reference.

BACKGROUND OF THE INVENTION

Field of the Invention

This invention relates to a vehicle differential apparatus.

Description of the Related Art

Conventionally, there is a known differential apparatus that include a pair of substantially cylindrical side gears in which a pair of left and right drive shafts are inserted, a set of pinion gears that are engaged with one and the other of the pair of side gears and also engaged with each other, and a housing that forms a space housing the pair of side gears and set of pinion gears. Such an apparatus is described in, for example, Japanese Patent Publication No. 5018505 (JP5018505B). The apparatus of JP5018505B is configured to divide each of the pair of side gears into a radially inward part and a radially outward part which engage with each other through splines (helical splines) having helical gears formed on an outer circumferential surface of the radially inward part and an inner circumferential surface of the radially outward part.

In the apparatus having an inward part and an outward part engaged with each other through helical splines, as described in JP5018505B, it is possible to increase a torque bias ratio defined as a torque distribution ratio between a left and right wheels. However, in this type of apparatus, a difference between a torque bias ratio when a total torque of the left and right wheels increases and a torque bias ratio when the total torque decreases occurs and may generate a negative impact on a vehicle performance.

SUMMARY OF THE INVENTION

An aspect of the present invention is a vehicle differential apparatus including: a pair of side gears arranged side by side with each other along an axial line and formed in substantially cylindrical shapes so as to rotate about the axial line; a set of pinion gears disposed on a radial outside of the pair of side gears so that one of the set of pinion gears engages with one of the pair of side gears, the other of the set of pinion gears engages with the other of the pair of side gears, and the set of pinion gears engage with each other; and a housing configured to form a housing space of the set of pinion gears so as to rotate integrally with the set of pinion gears about the axial line. Each of the pair of side gears includes an inner side gear and an outer side gear disposed on a radial inside and a radial outside around the axial line, the inner side gear includes a first spline extended along a helical gear formed on an outer circumferential surface of the inner side gear, the outer side gear includes a second spline extended along a helical gear formed on an inner circumferential surface of the outer side gear so as to engage with the first spline, and the helical gear of the first spline is formed so as to be crowned along a tooth trace thereof.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 7. A vehicle differential apparatus according to the embodiment of the present invention is disposed between left and right drive wheels and configured to distribute and transmit a torque from a drive source to the left and right drive wheels. The vehicle differential apparatus may be disposed between front and rear drive wheels and configured to distribute and transmit the torque from the drive source to the front and rear drive wheels. The drive source is, for example, an engine (internal combustion engine). The drive source may be an electric motor. Thus, the vehicle differential apparatus according to the present embodiment can be applied to various types of vehicles, such as vehicles that are driven by the power of an internal combustion engine, vehicles (electric vehicles) that are driven by the power of an electric motor, and vehicles that are driven by the power of both an internal combustion engine and an electric motor (hybrid vehicles).

Figure 1:
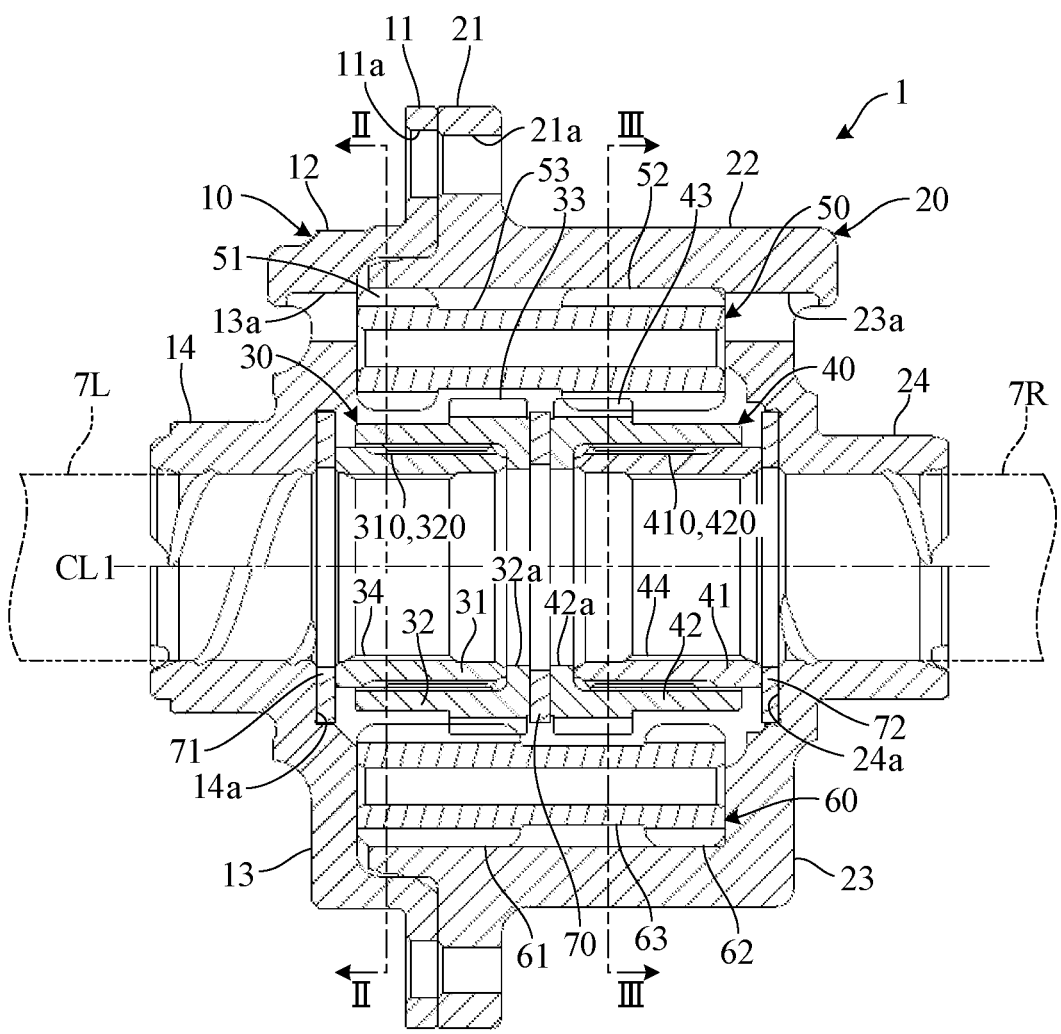
FIG. 1 is a cross-sectional view showing main components of a vehicle differential apparatus according to an embodiment of the present invention.

FIG. 1 is a sectional view showing main components of the vehicle differential apparatus according to the embodiment of the present invention. For convenience, the left-right direction is defined as shown in the drawings. The configuration of the components will be described in accordance with this definition. The left-right direction is the width direction of the vehicle and is a direction along an axis CL1. Hereafter, a direction along the axis CL1 is referred to as the axial direction, a direction radially extending from the axis CL1 as the radial direction, and a direction along a circle around the axis CL1 as the circumferential direction.

As shown in FIG. 1, the vehicle differential apparatus 1 includes a pair of left and right housings 10 and 20 integrally fastened to each other, and the housings 10 and 20 unitize the entire vehicle differential apparatus 1. The housing 10 on the left side may be referred to as the left housing, and the housing 20 on the right side as the right housing. The vehicle differential apparatus 1 is disposed in a transmission case (not shown) so as to be rotatable around the axis CL1.

The left housing 10 includes a substantially cylindrical circumferential wall 12 around the axis CL1, the flange 11 extending radially outward from the right end of the circumferential wall 12, a substantially ring plate-shaped side wall 13 extending radially inward from the left end of the circumferential wall 12, and a cylindrical portion 14 formed in a substantially cylindrical shape around the axis CL1 and extending leftward from the radially inner end of the side wall 13. The right housing 20 includes a substantially cylindrical circumferential wall 22 around the axis CL1, the flange 21 extending radially outward from the outer circumferential surface of the circumferential wall 22, a substantially ring plate-shaped side wall 23 extending radially inward from the right end of the circumferential wall 22, and a cylindrical portion 24 formed in a substantially cylindrical shape around the axis CL1 and extending rightward from the radially inner end of the side wall 23. The left end of the circumferential wall 22 is protruded to a more left position than the flange 21, and the outer circumferential surface of the left end is fitted to the inner circumferential surface of the circumferential wall 12 of the left housing 10.

Multiple through holes 11a in the circumferential direction are formed in the flange 11 of the left housing 10. Multiple screw holes 21a in the circumferential direction are formed in the flange 21 of the right housing 20, at the same positions in the circumferential direction as the through holes 11a. Bolts (not shown) inserted in the through holes 11a are screwed in the screw holes 21a to integrally fasten the flanges 11 and 21. The outer circumferential surface of the cylindrical portion 14 and the outer circumferential surface of the cylindrical portion 24 are supported rotatably from the transmission case through bearings (not shown). The drive shaft 7L is inserted in the cylindrical portion 14. The drive shaft 7R is inserted in the cylindrical portion 24. The side walls 13 and 23 are provided with through holes 13a and 23a so as to supply a lubricant oil into the housings 10 and 20.

Although not shown, a rotor with a gear is attached to the flanges 11 and 21. The gear of the rotor is engaged with an output gear of a transmission, and the torque from the drive source is inputted to the vehicle differential apparatus 1 through these gears. The torque input to the vehicle differential apparatus 1 is transmitted to the drive shafts 7L and 7R, which then rotationally drive the left and right drive wheels and thus causes the vehicle to travel. A gear engaged with the output gear of the transmission may be provided at the housings 10 or 20 itself.

The housings 10 and 20 accommodate a pair of substantially cylindrical left and right side gears 30 and 40 around the axis CL. The side gears 30 and 40 are configured so as to divide into two in the radial direction, and include inner side gears 31 and 41 on the inner diameter side and outer side gears 32 and 42 on the outer diameter side. The inner side gears 31, 41 and the outer side gears 32, 42 are formed so as to be bilaterally symmetrical.

Flange 32a and 42a are protruded inward in the radial direction at the right end of the outer side gear 32 and at the left end of the outer side gear 42, respectively. Helical gears 33 and 43 are formed in the outer circumferential surface of the outer side gears 32 and 42. More specifically, the helical gear 33 is formed on the outer circumferential surface at the right end of the outer side gear 32, and the helical gear 43 is formed on the outer circumferential surface at the left end of the outer side gear 42. The respective twist directions of the helical gears 33 and 43 are opposite. Spline holes 34 and 44 are formed on the inner circumferential surfaces of the inner side gears 31 and 41. Spline shafts (not shown) formed on the outer circumferential surfaces of the drive shafts 7L and 7R are fitted into the spline holes 34 and 44 (spline coupling). Thus, the inner side gear 31 and drive shaft 7L, and the inner side gear 41 and drive shaft 7R rotate integrally.

On the outer circumferential surfaces of the inner side gears 31 and 41, splines with helical gears, i.e., helical splines 310 and 410 (referred to as the shaft splines for convenience) are formed. On the inner circumferential surfaces of the outer side gears 32 and 42, splines with helical gears corresponding to the shaft splines 310 and 410, i.e., helical splines 320 and 420 (referred to as the hole splines for convenience) are formed.

The inner side gear 31 is fitted into the outer side gear 32 through the shaft spline 310 and the hole spline 320 so that the right end surface of the inner side gear 31 is brought into contact with the left end surface of the flange 32a of the outer side gear 32 (spline coupling), and thus the side gears 31 and 32 rotate integrally. The inner side gear 41 is fitted into the outer side gear 42 through the shaft spline 410 and the hole spline 420 so that the left end surface of the inner side gear 41 is brought into contact with the right end surface of the flange 42a of the outer side gear 42 (spline coupling), and thus the side gears 41 and 42 rotate integrally.

A substantially ring-shaped washer 70 around the axis CL1 is interposed between the flange 32a of the outer side gear 32 and the flange 42a of the outer side gear 42. Flange surfaces 14a and 24a are formed on the right end surface of the cylindrical portion 14 of the housing 10 and the left end surface of the cylindrical portion 24 of the housing 20. A substantially ring-shaped washer 71 around the axis CL1 is interposed between the left end surface of the inner side gear 31 and the flange surface 14a. A substantially ring-shaped washer 72 around the axis CL1 is interposed between the right end surface of the inner side gear 42 and the flange surface 24a.

Figure 2:
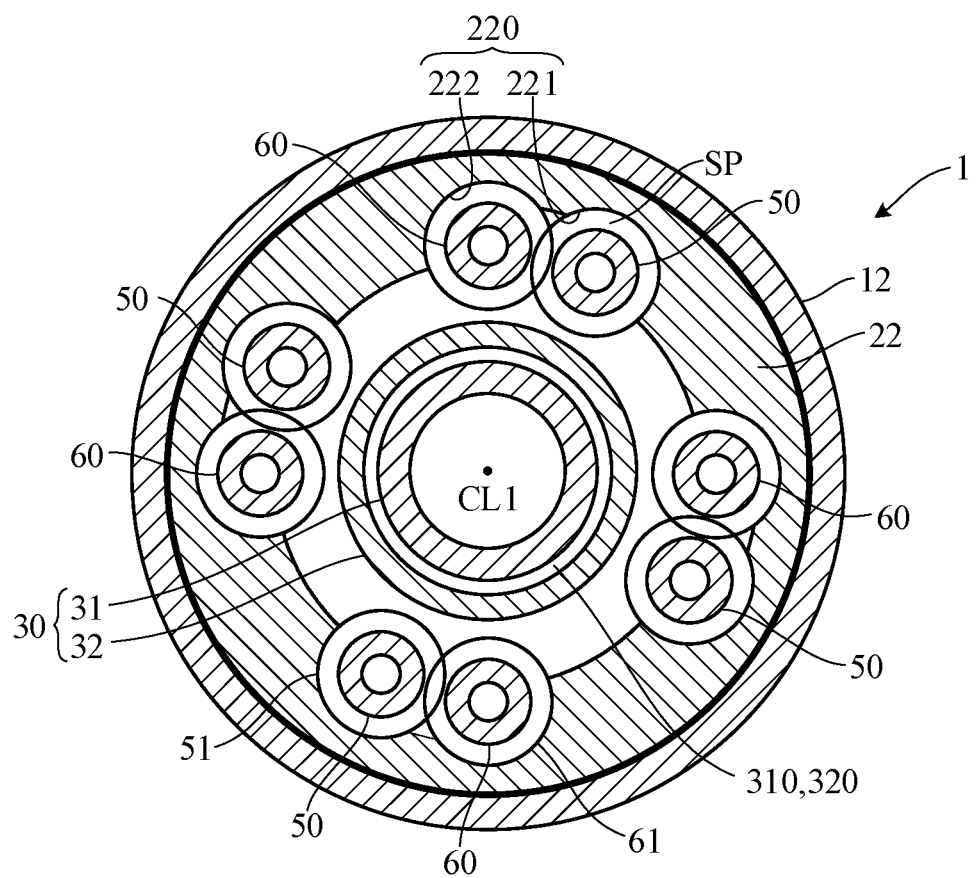
FIG. 2 is a cross-sectional view taken along line II-II of FIG. 1.
Figure 3:
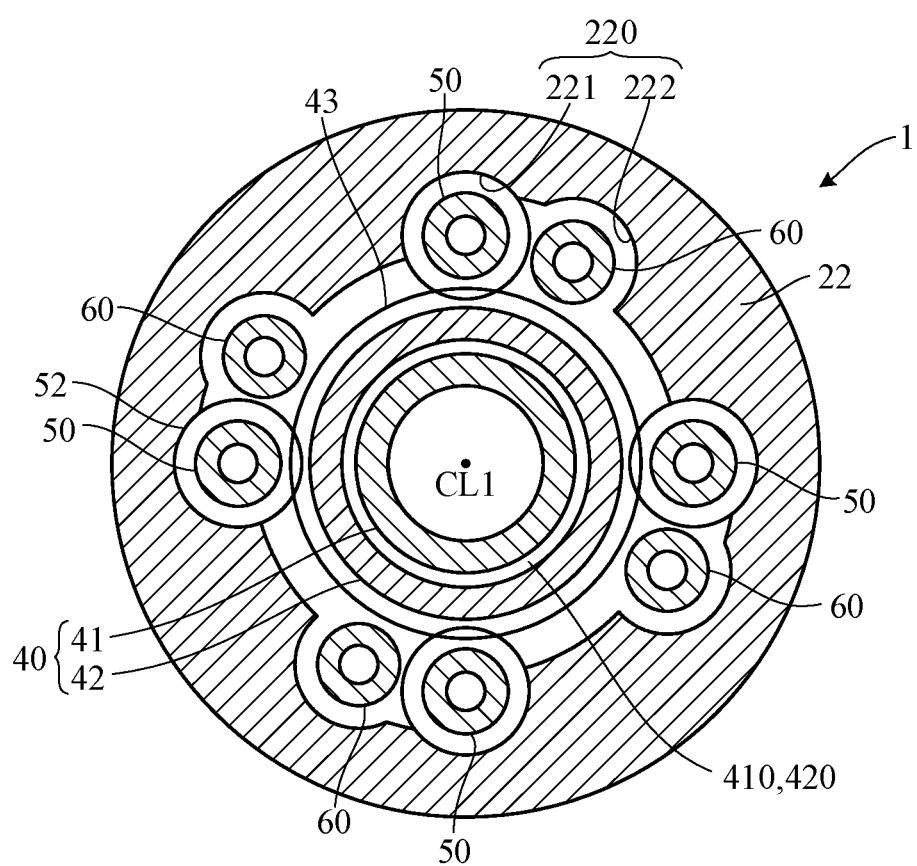
FIG. 3 is a cross-sectional view taken along line of FIG. 1.

FIG. 2 is a sectional view taken along line II-II of FIG. 1, and FIG. 3 is a sectional view taken along line of FIG. 1. As shown in FIG. 2, multiple (4 in the figure) recesses (bores) 220 are circumferentially disposed in the inner circumferential surface of the circumferential wall 22 of the substantially cylindrical right housing 20 around the axis CL1. Axially extending, substantially columnar or substantially cylindrical pairs of pinion gears (first pinion gear 50, second pinion gear 60) are disposed side by side in the recesses 220 in the circumferential direction. In other words, the recesses 220 serve as multiple concave housing spaces SP on the radially outside of the side gears 30 and 40, and the pinion gears 50 and 60 are accommodated in the housing spaces SP.

More specifically, each recess 220 includes a first recess 221 formed in a substantially arc shape corresponding to the external shape of a first pinon gear 50 and a second recess 222 formed in a substantially arc shape corresponding to the external shape of a second pinion gear 60. The first recess 221 and second recess 222 are connected in the circumferential direction, and the first pinon gear 50 and second pinion gear 60 are accommodated in the first recess 221 and second recess 222, respectively.

As shown in FIG. 1, the left and right ends of the housing spaces SP are closed by the side walls 13 and 23 of the housings 10 and 20. The pinion gears 50 and 60 have the same axial total length. The axial positions of the pinion gears 50 and 60 are regulated by the side walls 13 and 23, and the circumferential positions thereof are regulated by the recesses 221 and 222.

Helical gears 51 and 52 having the same outer diameter are formed on the left and right ends of the outer circumferential surfaces of the first pinon gear 50. A substantially cylindrical neck 53 having a smaller diameter than the helical gears 51 and 52 is formed between the left and right helical gears 51 and 52. The left helical gear 51 (referred to as the short gear) has a shorter axial length than the right helical gear 52 (referred to as the long gear). The short gear 51 and the long gear 52 have gear specifications corresponding to those of the helical gear 43 of the outer side gear 42, and the long gear 52 is engaged with the helical gear 43 (FIG. 3). On the other hand, the helical gear 33 of the outer side gear 32 faces the neck 53 through a clearance. Accordingly, the helical gear 33 is not engaged with the first pinon gear 50, and the short gear 51 is located in a more left position than the helical gear 33.

Helical gears 61 and 62 having the same outer diameter are formed on the left and right ends of the outer circumferential surfaces of the second pinon gear 60. A substantially cylindrical neck 63 having a smaller diameter than the helical gears 61 and 62 is formed between the left and right helical gears 61 and 62. The right helical gear 62 (referred to as the short gear) has a shorter axial length than the left helical gear 61 (referred to as the long gear). The long gear 61 and the short gear 62 have gear specifications corresponding to those of the helical gear 33 of the outer side gear 32, and the long gear 61 is engaged with the helical gear 33. On the other hand, the helical gear 43 of the outer side gear 42 faces the neck 63 through a clearance. Accordingly, the helical gear 43 is not engaged with the second pinon gear 60, and the short gear 62 is located in a more right position than the helical gear 43.

As shown in FIG. 2, the short gear 51 of the first pinon gear 50 and the long gear 61 of the second pinion gear 60 are engaged with each other. Although not shown, the long gear 52 of the first pinon gear 50 and the short gear 62 of the second pinion gear 60 are also engaged with each other. Thus, the torque is transmitted between the left side gear 30 and right side gear 40 through the first pinon gears 50 and second pinion gears 60.

When, in the vehicle differential apparatus 1 thus configured, the torque from the drive source is inputted to the housings 10 and 20, the housings 10 and 20 rotate around the axis CL1. At this time, the first pinon gears 50 and second pinion gears 60 revolve integrally with the housings 10 and 20 around the axis CL1 without rotating as long as the vehicle is traveling straight ahead and no slip is occurring between the left and right drive wheels and the road surface. Thus, the left and right side gears 30 and 40 rotate at the same speed, resulting in straight ahead travel of the vehicle.

On the other hand, when a slip occurs, for example, on the right drive wheel, the first pinon gears 50 and second pinion gears 60 rotate while being engaged with the side gears 30 and 40. This results in rotation of the left drive wheel at a lower speed than the housings 10 and 20 and rotation of the right drive wheel at a higher speed than the housings 10 and 20. At this time, a thrust force occurs on the side gears 30 and 40 due to the rotation of the first pinon gears 50 and second pinion gears 60. For example, during travel of the vehicle, a thrust force occurs that presses the side gears 30 and 40 inward in the left-right direction; during a deceleration of the vehicle (during engine brake activation), a thrust force occurs that presses the side gears 30 and 40 outward in the left-right direction.

Thus, a friction force (thrust reaction force) occurs between the outer side gears 32 and 42 and washer 70 or between the inner side gears 31 and 41 and washers 71 and 72, resulting in limitation of the differential motion of the side gears 30 and 40. Also, during rotation of the first pinon gears 50 and second pinion gears 60, a friction force (radial reaction force) occurs between the first pinon gears 50 and first recesses 221 and between the second pinion gears 60 and second recesses 222. This friction force also limits the differential motion of the side gears 30 and 40.

In the vehicle differential apparatus 1 thus configured, the magnitude of the torque bias ratio, which is the torque distribution ratio between the left and right wheels, depends on resistance to the differential rotation in the vehicle differential apparatus 1. In the case of side gears 30 and 40 having no helical splines, the above-mentioned thrust reaction force and radial reaction force serve as resistance to the differential rotation. On the other hand, in the case of the side gears 30 and 40 having the helical splines (shaft splines 310 and 410, hole splines 320 and 420), such as those of the present embodiment, not only the thrust reaction force and radial reaction force but also a friction force based on a spline reaction force serves as resistance to the differential rotation. Thus, the vehicle differential apparatus 1 having the helical splines is able to increase the torque bias ratio.

Figure 4A:
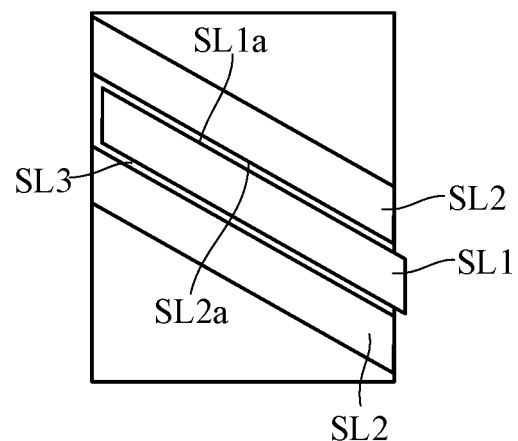
FIG. 4A is a drawing schematically showing an ideal engagement state of helical splines developed on a plane.
Figure 4B:
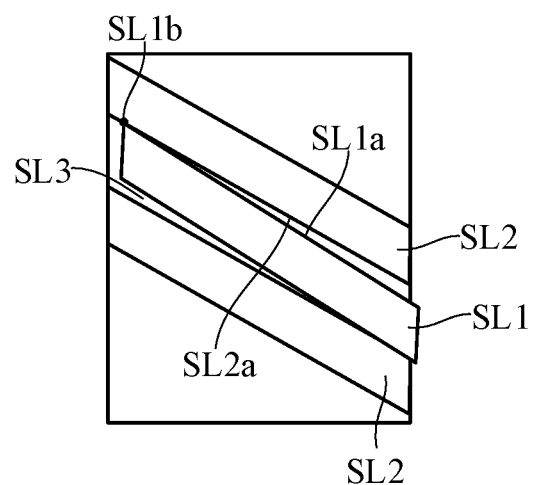
FIG. 4B is a drawing schematically showing an actual engagement state of the helical splines developed on a plane.

The vehicle differential apparatus configured to increase the torque bias ratio through the helical splines has the following problem. FIGS. 4A and 4B are drawings schematically showing the engagement state of the helical splines developed on a plane. In the drawings, SL1 represents the convex tooth of a shaft spline 310 or 410 (referred to as the shaft spline tooth), SL2 represents the convex tooth of a hole spline 320 or 420 (referred to as the hole spline tooth), and SL3 represents a concave groove between a pair of hole spline teeth SL2 adjacent in the circumferential direction (referred to as the spline groove). FIGS. 4A and 4B show only some of the shaft spline teeth SL1, hole spline teeth SL2, and spline grooves SL3.

FIG. 4A shows an ideal engagement state in which the helix angle (twist angle) of the shaft spline 310 or 410 and the helix angle (twist angle) of the hole splines 320 or 420 match each other. FIG. 4B shows an engagement state in which there is a difference of the order of dimensional tolerance between the helix angle of the shaft spline 310 or 410 and the helix angle of the hole splines 320 or 420. As shown in FIG. 4A, in the ideal engagement state, the end surface SL1$a$ of the shaft spline tooth SL1 and the end surface SL2$a$ of a hole spline tooth SL2 are in parallel. Thus, for example, when a torque is transmitted from the shaft side (inner side gears 31 and 41) to the hole side (outer side gears 32 and 42), the entire end surfaces SL1$a$ and SL2$a$ contact each other. As a result, a spline reaction force corresponding to the magnitude of the transmitted torque acts on the side gears 30 and 40, and a thrust in the left-right direction generates due to the spline helix angle.

On the other hand, if there is a difference between the helix angles as shown in FIG. 4B, the end surfaces SL1$a$ and SL2$a$ do not become parallel. Thus, when a torque is transmitted from the shaft side to the hole side, a corner SL1$b$ of the shaft spline tooth SL1 contacts the end surface SL2$a$ of the hole spline tooth SL2 and thus sliding friction occurs between the corner SL1$b$ and end surface SL2$a$. When the torque transmitted from the shaft side to the hole side is increased, the shaft spline tooth SL1 presses the end surface SL2$a$ of the hole spline tooth SL2 in the direction in which the spline groove SL3 expands, and thus generates a greater spline reaction force. However, when sliding friction is occurring between the corner SL1$b$ and end surface SL2$a$, the spline reaction force is reduced accordingly, that is, the spline reaction force is reduced compared to that in the ideal state described in FIG. 4A.

On the other hand, when the torque transmitted from the shaft side to the hole side is reduced, a pressing force acts on the end surface SL2a of the hole spline tooth SL2 in the direction in which the spline groove SL3 contracts, resulting in a reduction in the spline reaction force. However, when sliding friction is occurring between the corner SL1b and end surface SL2a, a reduction in the spline reaction force is blocked accordingly, that is, the spline reaction force is increased compared to that in the ideal state described in FIG. 4A.

In other words, if the corner SL1b is caught on the end surface SL2a when the drive force of the vehicle is increased, an increase in the spline reaction force in proportion to the increase in the transmitted torque is blocked; if the corner SL1b is caught on the end surface SL2a when the drive force is reduced, a reduction in the spline reaction force in proportion to the reduction in the transmitted torque is blocked. As a result, the torque bias ratio when the drive force is increased is reduced compared to that in the ideal state, and the torque bias ratio when the drive force is reduced is increased compared to that in the ideal state, making a difference in torque bias ratio between when the transmitted torque is increased and when the transmitted torque is reduced.

This phenomenon, in which a difference in torque bias ratio is made between when the transmitted torque is increased and when the transmitted torque is reduced, is hereafter referred to as the torque bias hysteresis. In terms of the vehicle performance, it is preferable that the torque bias hysteresis be as small as possible (e.g., 0). For this reason, the vehicle differential apparatus 1 according to the present embodiment is configured as follows so that the torque bias hysteresis is reduced.

Figure 5A:
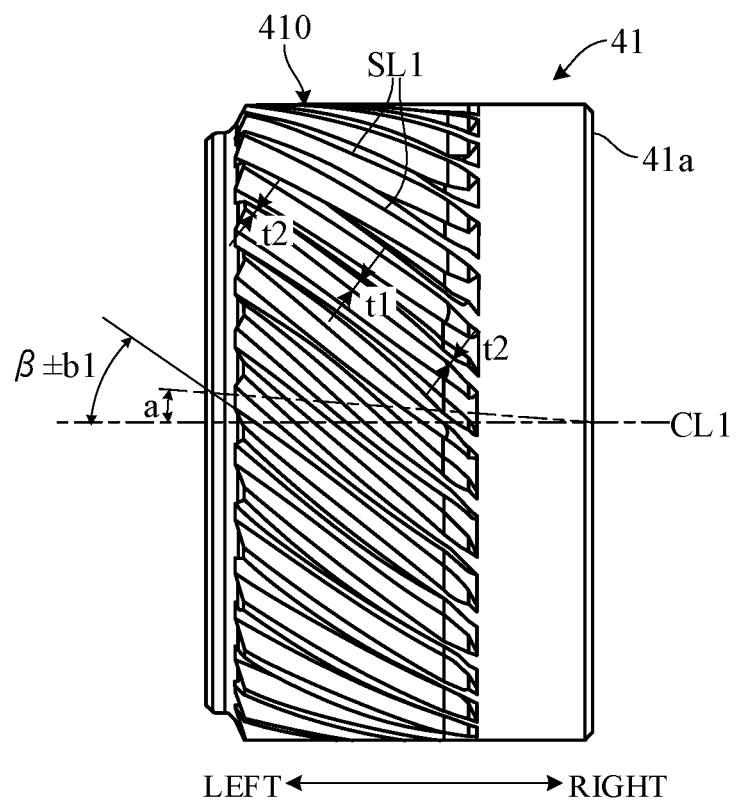
FIG. 5A is a side view showing an external shape of an inner side gear of FIG. 1.
Figure 5B:
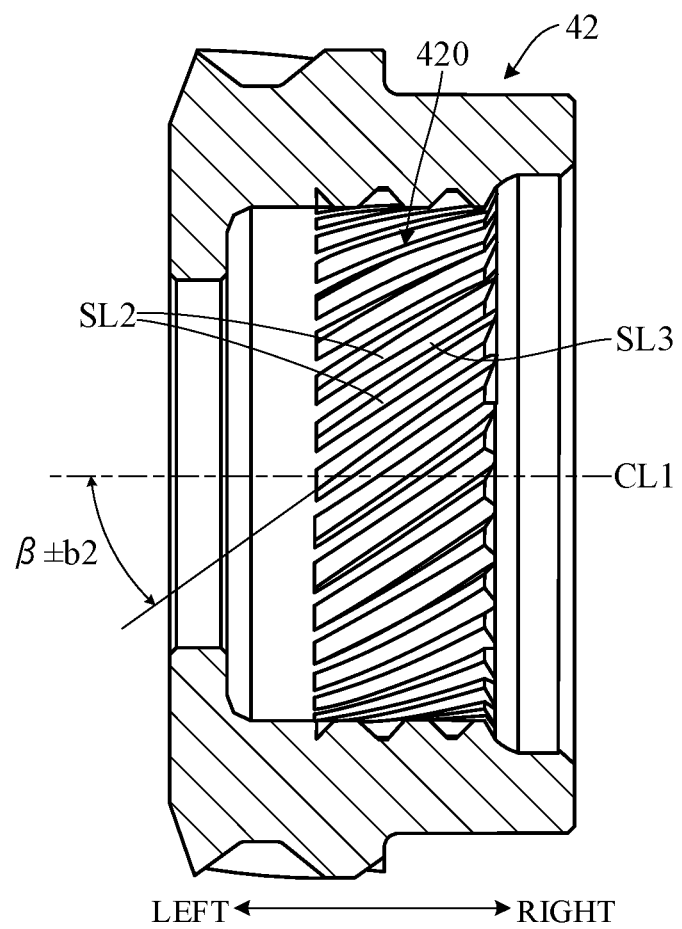
FIG. 5B is a cross-sectional view taken along a vertical plane of an outer side gear of FIG. 1.

FIG. 5A is a side view showing the external shape of the inner side gear 41 disposed on the right side, and FIG. 5B is a sectional view taken along a vertical plane including the axis CL1 of the outer side gear 42 disposed on the right side. Although not shown, the inner side gear 31 and outer side gear 32 disposed on the left side form a bilaterally symmetrical shape with the inner side gear 41 and outer side gear 42.

As shown in FIG. 5A, the shaft splines 410 of the inner side gear 41 are formed so as to form a helix angle β with the axis CL1, as well as are formed such that the tooth thickness t1 in the central portions in the tooth trace direction of the shaft spline teeth SL1 is greater than the tooth thickness t2 of both ends thereof. That is, the shaft spline teeth SL1 are crowned along the tooth trace. Here, the tolerance of the design value of the perpendicularity to the reference surface (e.g., a right end surface 41a) of the inner side gear 41 is defined as "a", and the tolerance of the helix angle β is defined as ±b1.

On the other hand, as shown in FIG. 5B, the hole splines 420 of the outer side gear 42 are formed so as to form the helix angle β with the axis CL1, as well as are formed such that the tooth thickness along the tooth trace is constant. Here, the tolerance of the design value of the helix angle β of the outer side gear 42 is defined as ±b2.

Figure 6:
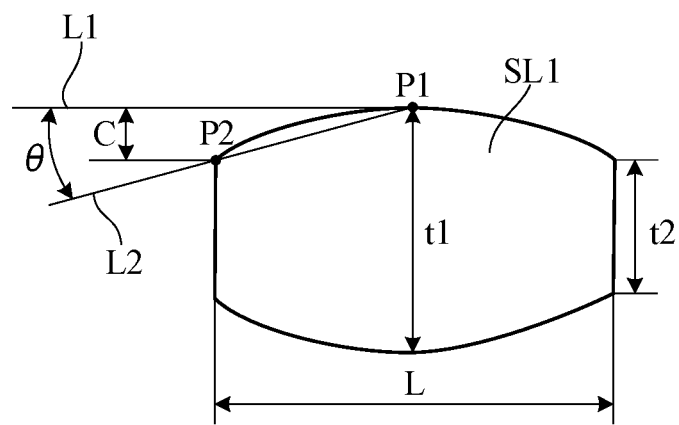
FIG. 6 is a drawing schematically showing a crowned shaft spline tooth.

FIG. 6 is a drawing schematically showing a crowned shaft spline tooth SL1. Here, the length in the tooth thickness direction from a point P2 on an end in the tooth trace direction of the shaft spline tooth SL1 to a point P1 in the central portion in the tooth trace direction thereof is defined as the amount of crowing C. The amount of crowing C is set so as to satisfy the following Formula (I).

$$C \geq L/2 \times \tan\theta \tag{I}$$

where L represents the overall length along the tooth trace direction of the shaft spline tooth SL1; and θ represents an angle formed by a reference line L1 parallel with the tooth trace direction and a straight line L2 passing through the points P1 and P2 (referred to as the crowning angle). The crowning angle θ is a target angle serving as a reference for determining the amount of crowing C. The crowning angle θ is calculated, for example, using the following Formula (II), considering the tolerances b1 and b2 of the helix angles β of the shaft spline 410 and hole spline 420 (FIGS. 5A, 5B) and the tolerance "a" of the perpendicularity of the inner side gear 41.

$$\Theta = a + b1 + b2 \tag{II}$$

Figure 7:
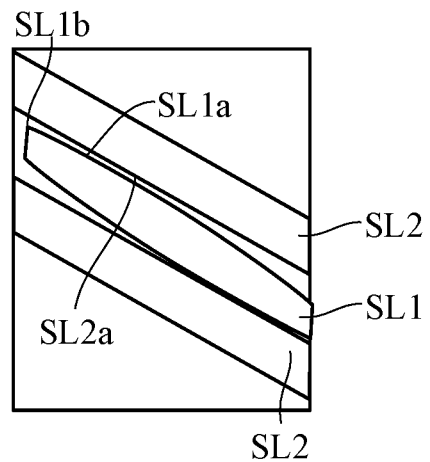
FIG. 7 is a drawing schematically showing an engagement state of helical splines included in the vehicle differential apparatus according to the embodiment of the invention.

The amount of crowing C is set by the above Formula (I) using the crowning angle θ thus calculated. Thus, when the torque is transmitted, the corner SL1b of the end surface SL1a of the shaft spline teeth SL1 is prevented from contacting the end surface SL2a of the hole spline tooth SL2, as shown in FIG. 7. As a result, when the drive force of the vehicle is increased, a reduction in the spline reaction force of the side gears 30 and 40 is suppressed; when the drive force is reduced, an increase in the spline reaction force is suppressed. This results in suppression of the torque bias hysteresis and an improvement in the vehicle performance.

According to the embodiment, the following operations and effects can be achieved.

(1) The vehicle differential apparatus 1 includes the pair of substantially cylindrical side gears 30 and 40 disposed side by side along the axis CL1 so as to rotate around the axis CL1; the pairs of pinion gears (first pinion gear 50 and second pinion gear 60) disposed on the radial outside of the pair of side gears 30 and 40, engaged with one and the other of the side gears 30 and 40, respectively, and engaged with each other; and the housings 10 and 20 forming the housing space SP of the pairs of pinion gears 50 and 60 so as to rotate integrally with the pairs of pinion gears 50 and 60 around the axis CL1 (FIGS. 1 to 3). The pair of side gears 30 and 40 include the inner side gears 31 and 41 and outer side gears 32 and 42 disposed on the radial inside and radial outside around the axis CL1 (FIG. 1). The inner side gears 31 and 41 include the shaft splines 310 and 410 extended along the helical gear (shaft spline teeth SL1) formed on the outer circumferential surfaces thereof (FIGS. 2, 3, and 5A). The outer side gears 32 and 42 include the hole splines 320 and 420 extended along the helical gear (hole spline teeth SL2) formed on the inner circumferential surfaces thereof so as to be engaged with the shaft splines 310 and 410 (FIGS. 2, 3, and 5B). The shaft spline teeth SL1 of the shaft splines 310 and 410 are formed so as to be crowned along the tooth trace (FIG. 7).

Thus, when the torque is transmitted, the corner SL1b of the end surface SL1a of each shaft spline tooth SL1 is prevented from contacting the end surface SL2a of a corresponding hole spline tooth SL2. This suppresses the difference in torque bias ratio between when the total torque of the left and right wheels is increased and when the total torque is reduced, that is, suppresses the torque bias hysteresis. As a result, a desired spline reaction force is generated during travel of the vehicle, leading to an improvement in the vehicle performance.

(2) The shaft spline teeth SL1 of the shaft splines 310 and 410 are formed such that the amount of crowing C, which is the length in the tooth thickness direction from the end (the point P2 in FIG. 6) in the tooth trace direction of the shaft spline 310 and 410 to the central portion (the point P1 in FIG. 6) in the tooth trace direction thereof becomes equal to or smaller than a value (Formula (I)) obtained by multiplying ½ of the length L in the tooth trace direction and the tangent value tan θ of the crowning angle θ obtained on the basis of the tolerance range (±b1) of the helix angle β of the shaft spline 310 and 410 and the tolerance range (±b2) of the helix angle β of the hole spline 320 and 420. Thus, the amount of crowing C is set to a value suitable to suppress the torque bias hysteresis.

(3) When obtaining the crowning angle θ as a target angle serving as a reference for determining the amount of crowing C, the tolerance range (a) of the perpendicularity of the inner side gear 31 or 41 to the reference surface of the inner side gear 31 or 41 (e.g., the right end surface 41a of inner side gear 41) perpendicular to the axis CL1 is also considered (Formula (II)). Thus, the amount of crowing C is set to a more suitable value.

The above-mentioned embodiment can be modified into various forms. Hereafter, modifications will be described. Although, in the above embodiment, the amount of crowing C serving as a target when crowning the shaft spline tooth SL1 along the tooth trace is calculated by the Formulas (I) and (II), the formula for calculating the amount of crowing C as a target is not limited to that described above. For example, the crowning angle θ, that is, a target angle of crowning may be calculated on the basis of only the tolerance range of the helix angle β of the shaft spline 310 or 410 (a first spline) and the tolerance range of the helix angle β of the hole spline 320 or 420 (a second spline).

Although, in the above embodiment, the pair of pinion gears 50 and 60 engaged with each other. i.e., the first pinon gears 50 and second pinion gears 60 are disposed on the radial outside of the side gears 30 and 40, the number of pinion gears 50 and 60 may be three or more. For example, a pair of second pinion gears may be disposed such that both sides in the circumferential direction of one first pinion gear are sandwiched between the pair of second pinion gears. In this case, the first pinon gears 50 may be formed so as to be longer or shorter in the axial direction than the second pinion gears 60. That is, a set of pinion gears may have any configuration as long as the set of pinion gears are disposed on the radial outside of the pair of side gears, engaged with one and the other of the pair of side gears, and engaged with each other. Although, in the above embodiment, the recesses 220 accommodating the set of pinion gears 50 and 60 are disposed in the inner circumferential surface of the circumferential wall 22 of the right housing 20, a housing need not have the above configuration as long as it accommodates the set of pinion gears 50 and 60 so as to rotate integrally with the housings.

The above embodiment can be combined as desired with one or more of the above modifications. The modifications can also be combined with one another.

According to the present invention, it is possible to suppress a difference in a torque bias ratio between when a total torque of a left and right wheels is increased and when the total torque is reduced.

Above, while the present invention has been described with reference to the preferred embodiments thereof, it will be understood, by those skilled in the art, that various changes and modifications may be made thereto without departing from the scope of the appended claims.

What is claimed is:

1. A vehicle differential apparatus comprising:
a pair of side gears arranged side by side with each other along an axial line and formed in substantially cylindrical shapes so as to rotate about the axial line;
a set of pinion gears disposed on a radial outside of the pair of side gears so that one of the set of pinion gears engages with one of the pair of side gears, the other of the set of pinion gears engages with the other of the pair of side gears, and the set of pinion gears engage with each other; and
a housing configured to form a housing space of the set of pinion gears so as to rotate integrally with the set of pinion gears about the axial line, wherein
each of the pair of side gears includes an inner side gear and an outer side gear disposed on a radial inside and a radial outside around the axial line,
the inner side gear includes a first spline extended along a helical gear formed on an outer circumferential surface of the inner side gear,
the outer side gear includes a second spline extended along a helical gear formed on an inner circumferential surface of the outer side gear so as to engage with the first spline, and
the helical gear of the first spline is formed so as to be crowned along a tooth trace thereof.

2. The vehicle differential apparatus according to claim 1, the helical gear of the first spline is formed so that an amount of a crowning defined as a length in a tooth thickness direction from an end in a tooth trace direction of the first spline to a central portion in the tooth trace direction becomes equal to or smaller than a value obtained by multiplying a half of a length of the first spline in the tooth trace direction and a tangent value of a target angle determined based on a tolerance range of a helix angle of the first spline and a tolerance range of a helix angle of the second spline.

3. The vehicle differential apparatus according to claim 2, wherein
the target angle is determined further based on a tolerance range of a perpendicularity of the inner side gear relative to a reference surface of the inner side gear perpendicular to the axial line.

4. The vehicle differential apparatus according to claim 1, wherein
the pair of side gears are a first side gear and a second side gear,
the set of pinion gears are a first pinion gear having a pair of first helical gears and a second pinion gear having a pair of second helical gears,
the pair of first helical gears are a first helical gear at a first end in the axial direction and a first helical gear at a second end in the axial direction,
the pair of second helical gears are a second helical gear at a first end in the axial direction and a second helical gear at a second end in the axial direction, and
the set of pinion gears are configured so that the first helical gear at the second end engages with the outer side gear of the second side gear, the second helical gear at the first end engages with the outer side gear of the first side gear, the first helical gear at the first end engages with the second helical gear at the first end, and the first helical gear at the second end engages with the second helical gear at the second end.

5. The vehicle differential apparatus according to claim 4, wherein the first helical gear at the first end is formed shorter than the second helical gear at the first end in the axial direction, and the first helical gear at the second end is formed longer than the second helical gear at the second end in the axial direction.

6. The vehicle differential apparatus according to claim 5, wherein a length of the first pinion gear in the axial direction is equal to a length of the second pinion gear in the axial direction.

7. The vehicle differential apparatus according to claim 1, wherein the vehicle differential apparatus is disposed between a left and right driving wheels so as to distribute and transmit a torque from a drive source to the left and right driving wheels.

* * * * *